UNITED STATES PATENT OFFICE.

JAMES M. HAWES, OF COVINGTON, KENTUCKY.

IMPROVEMENT IN CONCRETE PAVEMENTS.

Specification forming part of Letters Patent No. 119,607, dated October 3, 1871.

*To all whom it may concern:*

Be it known that I, JAMES M. HAWES, of Covington, in the county of Kenton and State of Kentucky, have invented a certain new and useful Improvement in Concrete Pavements, of which the following is a specification:

The nature of my invention relates to asphalt or concrete pavements; and it consists of a mechanical and chemical combination of the materials composing the same, and of the process of preparing and combining the materials for pavements, which are: crushed shells or coraline, asphalt either natural or mechanical, and a finely-pulverized powder, which unites with the asphalt and forms a strong cement to bind together the coarser particles of the crushed materials. The object of this invention is to provide a cheap and durable pavement, which will have the wearing qualities of stone and will not soften under the heat of the sun in warm climates, of sufficient elasticity to prevent breaking under the ordinary wear to which pavements are subjected, and which will not disintegrate by the action of the elements.

I take fossiliferous deposits of shell, such as are found in large quantities in the inlets, bayous, and bays along the Gulf of Mexico, and crush them into fragments, the larger of which should be in pieces of about half an inch in diameter, to form the coarser portions of the composition. From the same or similar material I prepare a finely-pulverized powder and thoroughly mix it with the coarser materials. I take asphalt (natural asphalt from the Isle of Trinidad preferred) and heat it to a temperature of from 250° to 300° Fahrenheit. To this I then add a small quantity of hydrocarbon-oil whose vaporizing point should be a temperature of not less than 250° Fahrenheit, which is used to soften the pitch and to assist in mixing the materials. I subject the crushed and pulverized shells to a heat of about 230° Fahrenheit, after which I immediately remove them to a suitable mixing vessel. The asphaltum, heated and prepared as aforesaid, is then poured into the mixing vessel and the whole mass thoroughly stirred till the shells or fossiliferous fragments are well coated with the cement which is formed by the union of the asphaltum and pulverized powder. The mass is immediately taken from the mixer while hot and laid upon the bed of the street or walk where the same is to be used, and uniformly spread, forming a layer of the required thickness, and stamped or rolled until it is sufficiently compact.

It is desirable to have the pavement laid upon a dry, solid base, which should be so prepared that water will not come in contact with the bottom or under side of the pavement. The coarser fragments of the crushed material embedded in the cement render the pavement durable.

Oxide of iron, chalky formation, or pure dry clay when finely pulverized and heated may be used with the melted asphaltum in lieu of pulverized shells, which perform a very important function in the composition of my pavement, the asphaltum alone being too brittle to form a strong cement for the pavement; it disintegrates or separates under the heat of the sun and atmospheric influences unless properly allied with other suitable material. The pulverized powder also assists in hardening the material of which the pavement is composed, while at the same time it does not entirely destroy the elasticity due to the presence of the asphaltum. The asphaltum alone becomes soft and waxy at a much lower degree of heat than when united with the powder. The hydrocarbon-oil softens the pitch and reduces its consistency so that it may be more readily united with the pulverized powder and more easily mixed with the crushed ingredients above referred to. The fossiliferous deposits of coral found in considerable quantities along the coast of Florida may be advantageously employed instead of the shells, the one being an equivalent to the other. Care should be taken to exclude sand or siliceous deposits, as the presence of granualated substances will impair the strength of the cement.

The percentage of pulverized powder and "dead oil" will depend somewhat on the character and consistency of the asphaltum employed. The following proportions I deem best adapted to secure the desired results, although they may be somewhat varied without materially affecting the result:

Crushed shells or coral, seventy-nine parts; pulverized powder, ten parts; Trinidad asphalt, ten parts; hydrocarbon-oil, (dead oil,) one part.

For street-pavements the material should be laid in two coatings or layers, one upon the other, each from an inch and a half to two inches in thickness. For walks, one coating of the same thickness will be sufficient.

The several ingredients should be mixed at or near the place where it is to be used, as cooling and reheating the material after it has once been mixed impairs its utility.

Having described my invention, what I claim as new, and desire to secure by Letters Patent, is—

1. The process of preparing a pavement substantially in the manner herein set forth.

2. A pavement composed of the ingredients specified, and prepared and laid substantially as herein set forth.

J. M. HAWES.

Witnesses:
 EDWARD BOYD,
 E. E. WOOD.